May 16, 1967 A. J. CAMPBELL ETAL 3,319,482
WORM AND WHEEL GEARING AND HOUSING THEREFOR
Filed June 15, 1965 2 Sheets-Sheet 1

INVENTORS
ANDREW J. CAMPBELL
BY ROBERT L. FISCHER

ATTORNEYS

May 16, 1967 A. J. CAMPBELL ETAL 3,319,482
WORM AND WHEEL GEARING AND HOUSING THEREFOR
Filed June 15, 1965 2 Sheets-Sheet 2
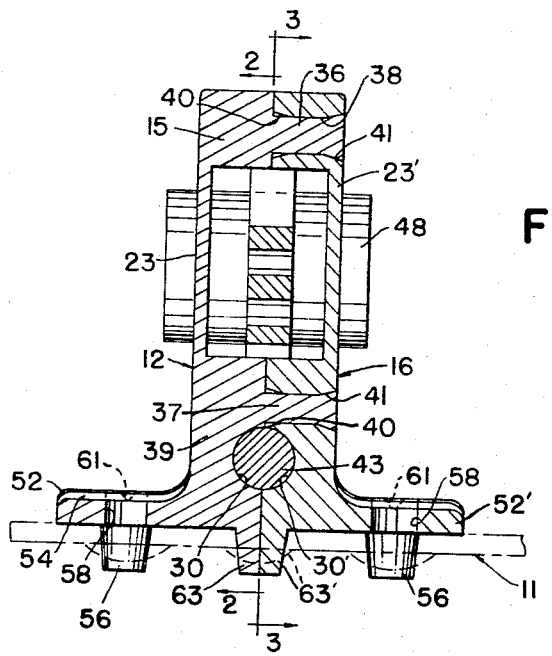
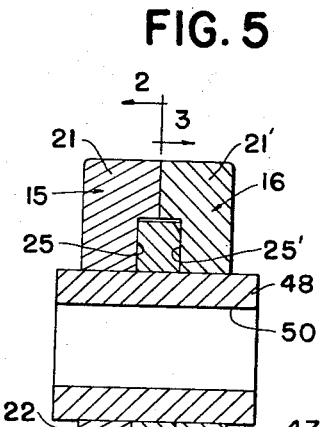
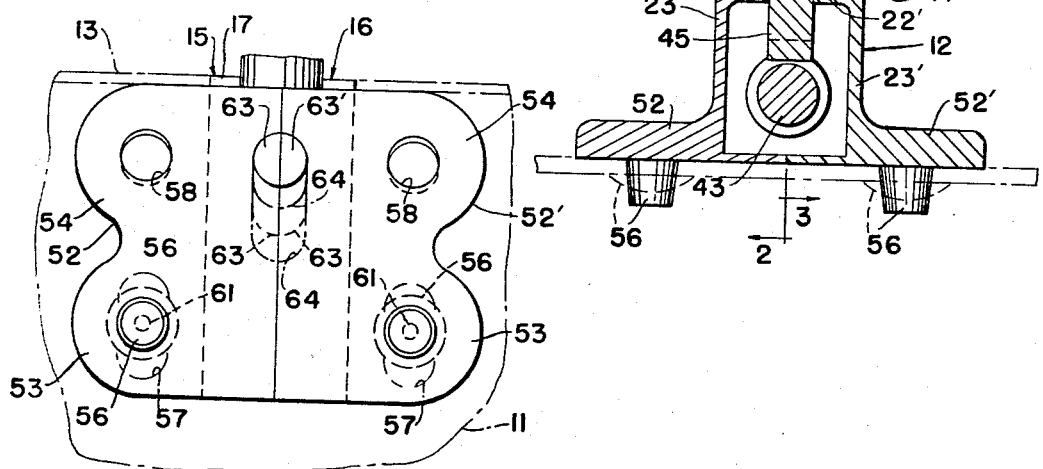
INVENTORS
ANDREW J. CAMPBELL
ROBERT L. FISCHER
BY
ATTORNEYS

United States Patent Office 3,319,482
Patented May 16, 1967

3,319,482
WORM AND WHEEL GEARING AND
HOUSING THEREFOR
Andrew J. Campbell, Southfield, and Robert L. Fischer, Detroit, Mich., assignors to Al-Craft Manufacturing Company, Troy, Mich., a corporation of Michigan
Filed June 15, 1965, Ser. No. 463,994
9 Claims. (Cl. 74—425)

ABSTRACT OF THE DISCLOSURE

An operator for a window which has a two-part die cast housing internally journalling a worm and worm gear meshing with the worm and operatively connected to the window. The housing parts meet, are joined in a radial plane centered on the gear and have internal boss means limiting the rotation of the gear. The housing parts are staked together at integral formations on one thereof; and each part also has integral external dowel formations which coact in the location and mounting of the housing on a window frame.

---

The present invention relates in particular to an improved center operator for a louver-type window of a mobile home or automobile trailer, although it is to be understood that the principles of the invention are also applicable in hardware for the operation of windows or equivalent members of a more general nature. However, in view of the importance of conserving to the greatest possible degree the space available for living purposes within the limited confine of the usual trailer home, an important feature of the improved operator is that it is of maximum compactness consistent with needed ruggedness, hence is ideally adapted for use in the specially intended setting.

Accordingly, the operator of the invention employs a hand crank actuated, worm and worm gear drive assembly, of which the output gear is adapted to be direct-connected outwardly of a small-sized gear housing with shafting which operates a conventional window opening and closing linkage or linkages, and the shaft of the worm is similarly connected directly to a hand crank, the worm and gear being journaled on the housing walls by bearing means of a very compact, simple and inexpensive, but efficient sort.

It is a further object of the invention to provide a center operator of the type described which, with the exception of its worm and gear components, is fabricated in its entirety of a pair of hollow die cast housing or casing parts, with arrangements made in the design of these parts to most strongly brace internally and rigidify the operator when the parts are assembled face-to-face and mounted to the usual window sill extrusion of the vehicle. By reason of its strength combined with relatively low cost, we prefer that the housing components be zinc die castings, although other materials appropriate to the purpose are available and also contemplated.

Moreover, these parts are in large measure mirror images of one another, internally and externally, save for certain integral dowel provisions thereof by which their assembly to one another is greatly facilitated, so that, as assembled and mounted, the operator presents a very pleasing appearance.

Another object is to provide window operating hardware of the sort referred to which, in the interest of small size and compactness as mentioned above, employs worm gear actuation. The gear is a segmental or mutilated type having spur teeth extending in the neighborhood of 220° about its periphery, and the housing parts of the operator have integral stop means built therein to be engaged by teeth at opposite ends of the toothless sector of the gear in limiting the rotation of the gear between fully open and fully closed positions.

Of course, the design of the worm and worm gear in regard to tooth size and helical pitch may be readily varied, as may also the design of the window operating linkage driven thereby, to produce a desired window movement upon a given number of turns of the worm's operating crank.

More specifically in reference to the housing structure, its die castings, similar in design and construction to the extent of approximating mirror images, include a basic housing or casing part carrying a number of integral projecting dowels on a side face thereof, and a coacting cover part having a like number of correspondingly located through-holes in which the respective dowels are received to locate the castings relative to one another. The dowels are spun over from the exterior of the cover casting to complete a union of the housing parts in a rigid, separation-resistant engagement with one another; and the assembly is very readily and quickly accomplished, indeed.

Further in accordance with the invention, each of the housing castings has an enlarged bottom flange formation at which improved provision to also facilitate and expedite the mounting of the operator on the window frame extrusion is made. To this end, the flanges are provided with transversely aligned and symmetrically located, integral dowel formations projecting from the bottom surface thereof. These dowels are received in pre-punched apertures in the sill extrusion, and are then headed or spun over beneath the latter to complete the connection.

The flanges are each also provided, to the rear of these dowels, with a screw-receiving aperture which inclines through the thickness of the flange in the direction toward the respective dowels. Accordingly, self-threading screws may be applied to the flange and taken up with the extrusion to complete, in coaction with the dowels, a locked connection of the operator to the widow frame sill part.

The bottom housing flanges are preferably provided with indented drill points on the upper surface thereof, in vertical alignment with the respective extrusion-engaging dowels, for the purpose of enabling the center operator to be later removed and replaced, if desired, by simply drilling out the dowels and removing the attaching screws.

In view of the fact that, since the actuator worm gear of the operator may be engaged under substantial force, at limiting open and shut positions, with the integral internal stop means of the operator housing, with an attendant arising of substantial reactive side spreading thrust, at 90° to the plane of meeting of the housing parts, against the worm bearings, the invention contemplates improved means built into the operator to resist this separating force.

Specifically, the means just referred to takes the form of an integral bottom, half-dowel projection or part in a zone on each of the housing members which is flush with the plane of meeting thereof when assembled. These dowel parts may be semi-circular or semi-oblong in cross section, with the rectilinear edges thereof flush with the meeting plane; and, as assembled, the resultant two piece dowel of circular or oblong section is snugly received in a pre-pierced opening in the window sill extrusion, being gripped at its opposite sides by such opening. Thus, the dowel in question transfers directly to the sill extrusion the stress on the worm bearings tending to separate the housing castings. The reinforcing dowel may be spun over from beneath the sill extrusion, in the manner of the pair of locating dowels referred to above, or may simply be left to project beneath the bottom surface of the extrusion.

The foregoing as well as other objects will become more apparent as this description proceeds, especially when considered in connection with the accompanying drawings illustrating the invention, wherein:

FIG. 4 is a view in vertical section along broken line 4—4 of FIGS. 2 and 3;

FIG. 5 is a similar view in section along line 5—5 of FIGS. 2 and 3; and

FIG. 6 is a bottom plan view of the operator, illustrating its mode of assembly to the window frame extrusion, indicated in dot-dash line.

Figure 1:
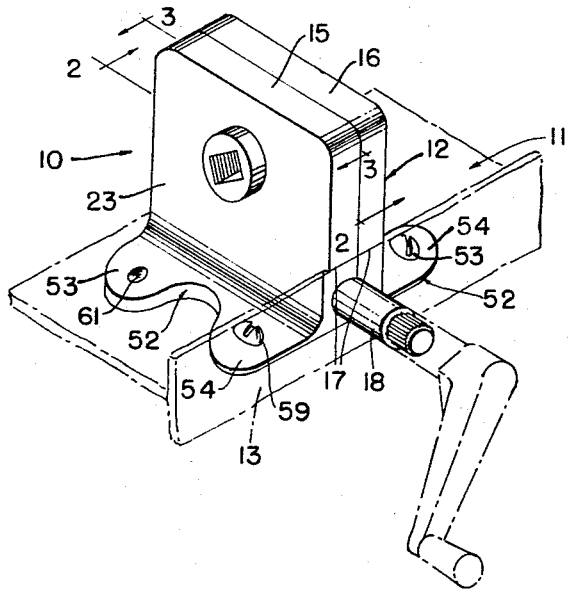
FIG. 1 is a perspective view illustrating the improved center operator of the invention as operatively applied to a window sill extrusion, shown in dot-dash line, of a trailer, an operating handpiece or crank of the operator also being illustrated in dot-dash line.

The center operator 10 of the invention is shown in FIG. 1 as being operatively mounted atop the usual sill extrusion 11 (dot-dash line) of the trailer window opening, the housing 12 of the operator being directly abutted against an integral upright T-flange portion 13 of the extrusion. Housing 12 is made up of a pair of housing body and housing cover components 15, 16, respectively, each recessed or notched at 17 from beneath one end thereof to accommodate the extrusion flange 13. The latter is apertured to receive the outwardly projecting, enlarged extension 18 of the horizontal shaft of an actuator worm within the housing 12, to be described.

Figure 2:
FIG. 2 is a side elevational view, as from the upright medial plane 2—2 of FIGS. 1, 4 and 5, of the interior of one of the constituent die cast housing or casing parts of the operator, in this case a cover part, also indicating in dotted line the mode of final assembly of the housing as a whole to the sill extrusion and, in dot-dash line, the location of certain worm gear bearing means.
Figure 3:
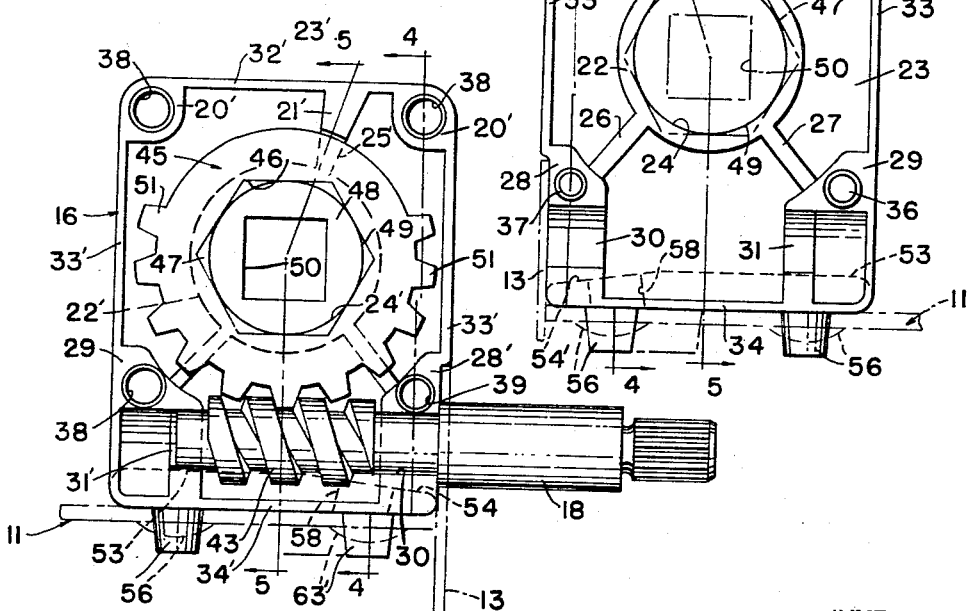
FIG. 3 is a similar side elevational view, as from the upright plane 3—3 of FIGS. 1, 4 and 5 showing the other housing body part, with worm and worm gear actuating components operatively assembled thereto prior to joining the housing castings.

Viewed interiorly, as in FIG. 2 and 3, the respective housing or casing members 15, 16 are seen to be in large measure identical. That is, first considering the housing body 15 proper of FIG. 2, it is die cast to provide a pair of internal top corner bosses 20 coming flush with the meeting plane of the housing parts when assembled and, also to come flush with that plane, an integral stop projection or boss 21, by which the angular sweep in both directions of the worm gear of the actuator of the unit is to be limited.

A circular bearing embossment 22 of lesser axial extent than stop boss 21 (about one-half) is cast on the inside of the side wall 23 of housing part 15, the embossment outlining a worm gear bearing opening 24; and at its radially inner end the stop boss 21 is reduced in axial height or thickness at 25 to be coextensive with the bearing embossment 22. Further radially extending, spoke-like rigidifying embossments 26, 27 of the same axial thickness or height as embossment 22 bring the latter into integral connection with a pair of lower corner bosses 28, 29, respectively, which are of the same axial extent as the upper corner bosses 20. Boss 28 is shaped to provide a semi-cylindrical bearing formation 30, while boss 29 has a further semi-cylindrical bearing formation 31 in axial alignment with the formation 30. The wall structure of housing part 15 is completed by top, end and bottom wall lengths 32, 33 and 34, respectively, integral and inwardly coextensive with the bosses and embossments 20, 21, 28 and 29.

Reference being now had to FIG. 3, it is seen by comparison with FIG. 2 showing the housing part 15, proper, that the other housing cover part 16 is in the main die cast identically as a mirror image of the part 15, with the sole exception of certain dowel-type locating and interlocking provisions presently to be described. Accordingly, to the extent that various internal structural provisions of cover 16 correspond with those of body part 15, they are designated by corresponding reference numerals, primed, and further description thereof is dispensed with.

Considering FIG. 2 in conjunction with FIG. 4 of the drawings, housing body 15 is die cast at three of its lower bosses 20, 20 and 29 to provide like integral, laterally projecting dowels 36 of circular cross section and a slight lead taper; while a dowel 37 of the same length but smaller diameter is provided on the fourth boss 28. The difference in dowel size at this location is necessitated by the relatively small area there available.

Now referring to FIG. 3 in conjunction with FIG. 4, the two upper corner, internal bosses 20' of fixed housing cover 16 and its lower boss 29' are shown as provided with dowel-receiving holes 38 of a size to snugly receive dowels 20, 20 and 29, respectively, while its remaining lower boss 28' has a smaller sized hole 39 to similarly receive the smaller dowel 37 of part 15. As best illustrated in FIG. 4, the various holes 38, 39 are formed with entrance draft at 40 to facilitate reception of the dowels in assembly, and are also externally chamfered at 41 to permit the dowel ends to be spun flat and flush with the outer surface of cover housing wall 23' (FIG. 4), thus securely locking the housing parts 15 and 16 in assembled condition.

Referring to FIGS. 3, 4 and 5, the assembled housing structure 12 internally receives a worm 43 which is rotatively piloted at one end in the cylindrical bearing provided by the coacting bearing formations 31, 31' of the housing members, and intermediate its helix and external shaft extension 18 is further journaled in the coacting further bearing formations 30, 30' of the respective housing bosses 28, 28'.

Worm 43 meshes upwardly with a worm gear 45, which is itself annular in shape, having a hexagonal center opening 46 into which is force-fitted a corresponding hex formation 47 of a bearing member 48. On either side of the formation 47 the bearing member has cylindrical bearing surfaces 49 which are journaled in the respective bearing openings 24, 24' of the housing body and cover members 15, 16. In order to drivingly receive the shafting (not shown) which connects operator 10 to window-swinging linkage (also not shown), the bearing 47 is provided with a central through-opening 51 of square outline.

As appears in FIG. 3, the worm gear 45 is a mutilated type, lacking teeth in a peripheral sector of about 116°—121° extent, at which zone the gear is received radially inwardly of the stop bosses 21, 21' of the housing members, and between the cutaway portions 25, 25' of those bosses. Thus, the endmost teeth 51 of segmental gear 45 are engageable from opposite directions with the coacting stops 21, 21' to limit the arcuate swing of the gear to the extent indicated, i.e., about 220°.

As indicated above, the housing 12 also has improved means for locating and securing the same to the window frame extrusion 11, outwardly abutting the flange 13 of the latter as indicated in FIG. 1. To this end, reference being had to FIGS. 2 through 6, the parts 15, 16 are die cast to provide like bottom flange formations 52, 52' at the sides thereof each presenting a laterally outwardly projecting, imperforate portion 53 and, in longitudinal alignment therewith as shown in FIG. 1, a perforate portion 54 whose upper surface is at a mild downward rake angle. See also FIGS. 2, 3 and 4.

The imperforate flange portions 53 are die cast to provide integral, downwardly extending dowels 56 which are receivable in pre-punched or pre-formed openings 57 (FIG. 6) in sill extrusion 11, the openings being preferably elongated to permit some sliding adjustment of the housing 12 in making the mount.

On the other hand, the other flange portions 54 are drilled to provide holes 58 at a right angle to the inclined top thereof and forwardly toward the respective dowels 56, in order to receive screws 59 (FIG. 1) to complete the mount of the operator 10 on the window extrusion 11. Small drill points or indentations 61 are formed at the top of the housing flange portions 53, in alignment with the bottom dowels 56 thereof, for the purpose of enabling the latter to be drilled out, should it be desired to remove and replace operator 10. As indicated in dotted line in FIGS. 2–6, it is intended that the dowels 56 be swedged or spun over to lock housing 12 from beneath to the extrusion 11 when the operator has been properly positioned in place.

It is contemplated that still further dowel provisions be built into the housing members 15, 16 in order to resist spreading thrust exerted at the worm bearings 30, 31' and 31, 31', as by reaction when the end teeth 51 of the segmental worm gear series are forcibly abutted against the composite housing stop 21, 21', or in the event an obstruction to cranking is encountered. To this end, the respective housings are cast adjacent their planar meeting surfaces to provide semi-circular, downwardly projecting half bosses 63, 63', whose rectilinear edges are flush with the meeting plane, as best shown in FIGS. 4 and 6. With the housing halves tightly drawn together, the composite circular boss 63, 63' is received in an elongated opening 64 (dot-dash line in FIG. 6) in the sill extrusion 11, so that spreading thrust from the dowel is transferred directly to the extrusion at either side of opening 64. In the alternative, it may be desirable to make the boss in question in an elongated oblong outline, as illustrated in dotted line in FIG. 6, providing the extrusion with a still more elongated opening 64, also shown in dot-dash line. Thus the spreading force is distributed to the extrusion at a line engagement and under lower unit pressure than in the case of a circular section dowel. In either case, the two-piece, anti-spread dowel 63, 63' may or may not be swedged or spun over against the bottom of the extrusion, as indicated in dotted line in FIGS. 3 and 4.

It is seen from the above that the invention affords an extremely compact and attractive appearing center operator for swinging windows mounted to extruded frames, as is the common practice in mobile home or trailer installations. Other than in its worm and worm gear actuating provisions, the operator is made up solely of a hollow housing constituted by similar inexpensively die cast parts, each of which has like internal provisions to brace the same and afford worm and gear bearings entirely within the housing structure; and the castings further include very simple and readily manipulated dowel provisions of an improved nature for their quick and easy assembly to complete the operator, and to install it on the window frame sill.

What we claim as our invention is:

1. An operator of the type described, comprising a housing made up solely of a pair of closely similar, hollow die-cast housing parts each provided with integral spaced boss formations in the interior thereof, which formations have surfaces substantially flush with a meeting plane at which said parts are assembled in face-to-face engagement with one another to constitute said housing, and further boss-like formations outlining axially aligned internal worm gear bearing surfaces in the respective housing parts, some of said first-named, boss formations of one of said parts having integral dowels projecting from the flush surfaces thereof for mating engagement in and through openings in corresponding formations of the other part, certain of said boss formations engaging one another to provide a gear limiting stop, others thereof being formed to provide axially spaced and aligned worm bearing surfaces in the housing, a segmental worm gear journaled in said gear bearing surfaces for engagement of end teeth thereof with said stop to limit swing of said gear, an output member connected to said worm gear and extending externally of said housing, and a worm journaled in said worm bearing surfaces in mesh with said worm gear, said worm having means to operate the same from the exterior of said housing.

2. A window operator comprising a housing including a pair of closely similar, hollow die-cast housing parts fixedly secured in face-to-face engagement with one another and provided with worm gear bearing means and worm bearing means at 90° to one another, a worm gear journaled in said gear bearing means and a worm journaled in said worm bearing means in mesh with said worm gear, said worm having means to operate the same from the exterior of said housing, said housing parts each having a laterally extending bottom flange provided with an integral dowel projecting downwardly thereof for locating engagement with a window frame member.

3. A window operator comprising a housing including a pair of closely similar, hollow die-cast housing parts fixedly secured in face-to-face engagement with one another and provided with worm gear bearing means and worm bearing means at 90° to one another, a worm gear journaled in said gear gearing means, and a worm journaled in said worm bearing means in mesh with said worm gear, said worm having means to operate the same from the exterior of said housing, said housing parts each having an integral, downwardly extending dowel part presenting a surace substantially flush with a meeting plane of the housing parts, said dowel parts providing a two-piece spread resisting bottom dowel for said housing engageable with a window frame member.

4. A window operator comprising a housing including a pair of closely similar, hollow die-cast housing parts fixedly secured in face-to-face engagement with one another and provided with worm gear bearing means and worm bearing means at 90° to one another, a worm gear journaled in said gear bearing means, and a worm journaled in said worm bearing means in mesh with said worm gear, said worm having means to operate the same from the exterior of said housing, said housing parts each having a laterally extending bottom flange provided with an integral dowel projecting downwardly thereof for locating engagement with a window frame member, and each having an integral, downwardly extending dowel part presenting a surface substantially flush with a meeting plane of the housing parts, said dowel parts providing a two-piece, spread resisting bottom dowel for said housing engageable with said window frame member.

5. A window operator comprising a housing made up solely of a pair of closely similar, hollow die-cast housing parts fixedly secured in face-to-face engagement with one another and provided with worm gear bearing means and worm bearing means at 90° to one another, a worm gear journaled in said gear bearing means, and a worm journaled in said worm bearing means in mesh with said worm gear, said worm having means to operate the same from the exterior of said housing, said housing parts each having a laterally extending bottom flange provided with an integral dowel projecting downwardly thereof for locating engagement with a window frame member, and each having an integral, downwardly extending dowel part presenting a surface substantially flush with a meeting plane of the housing parts, said dowel parts providing a two-piece, spread resisting bottom dowel for said housing engageable with said window frame member.

6. An operator of the type described, comprising a housing made up solely of a pair of closely similar, hollow housing parts each provided with spaced boss formations in the interior thereof, which formations have surfaces at which said parts are in face-to-face engagement with one another, and further boss-like formations outlining axially aligned worm gear bearing surfaces in the respective housing parts, said boss formations of one of said parts having integral dowels projecting therefrom for mating engagement in openings in corresponding formations of the other part, certain of said boss formations engaging one another to provide a gear limiting stop, others thereof being formed to provide axially spaced and aligned worm bearing surfaces in the housing, a segmental worm gear journaled in said gear bearing surfaces for engagement of end teeth thereof with said stop to limit swing of said gear, an output member connected to said worm gear and extending externally of said housing, a worm journaled in said worm bearing surfaces in mesh with said worm gear, said worm having means to operate the same from the exterior of said housing, said housing parts each having a laterally extending bottom flange provided with an integral dowel projecting downwardly thereof.

7. An operator of the type described, comprising a housing made up solely of a pair of closely similar, hollow housing parts each provided with spaced boss formations in the interior thereof, which formations have surfaces substantially flush with a meeting plane at which said parts are assembled in face-to-face engagement with one another to constitute said housing, and further boss-like formations outlining axially aligned worm gear bearing surfaces in the respective housing parts, said boss formations of one said parts having integral dowels projecting from the flush surfaces thereof for mating engagement in and through openings in corresponding formations of the other part, certain of said boss formations engaging one another to provide a gear limiting stop, others thereof being formed to provide axially spaced and aligned worm bearing surfaces in the housing, a segmental worm gear journaled in said gear bearing surfaces for engagement of end teeth thereof with said stop to limit swing of said gear, an output member connected to said worm gear and extending externally of said housing, a worm journaled in said worm bearing surfaces in mesh with said worm gear, said worm having means to operate the same from the exterior of said housing, said housing parts each having a laterally extending bottom flange provided with an integral dowel projecting downwardly thereof.

8. An operator of the type described, comprising a housing made up solely of a pair of closely similar, hollow housing parts each provided with spaced boss formations in the interior thereof, which formations have surfaces substantially flush with a meeting plane at which said parts are assembled in face-to-face engagement with one another to constitute said housing, and further boss-like formations outlining axially aligned worm gear bearing surfaces in the respective housing parts, said boss formations of one of said parts having integral dowels projecting from the flush surfaces thereof for mating engagement in and through openings in corresponding formations of the other part, certain of said boss formations engaging one another to provide a gear limiting stop, others thereof being formed to provide axially spaced and aligned worm bearing surfaces in the housing, a segmental worm gear journaled in said gear bearing surfaces for engagement of end teeth thereof with said stop to limit swing of said gear, an output member connected to said worm gear and extending externally of said housing, a worm journaled in said worm bearing surfaces in mesh with said worm gear, said worm having means to operate the same from the exterior of said housing, said housing parts each having a laterally extending bottom flange provided with an integral dowel projecting downwardly thereof, and each having an integral, downwardly extending dowel part presenting a surface substantially flush with said meeting plane of the housing parts, said dowel parts providing a two-piece, spread resisting bottom dowel for said housing.

9. A window operator comprising a housing including a pair of housing parts fixedly secured in face-to-face engagement with one another and provided with worm gear bearing means and worm bearing means at 90° to one another, a worm gear journaled in said gear bearing means, and a worm journaled in said worm bearing means in mesh with said worm gear, said worm having means to operate the same from the exterior of said housing, said housing parts each having a laterally extending bottom flange provided with an integral dowel projecting downwardly thereof for locating engagement with a window frame member, and each having an integral, downwardly extending dowel part presenting a surface substantially flush with a meeting plane of the housing parts, said dowel parts providing a two-piece, spread resisting bottom dowel for said housing engageable with said window frame member.

References Cited by the Examiner

UNITED STATES PATENTS

| | | | |
|---|---|---|---|
| 1,437,017 | 11/1922 | Robert. | |
| 1,781,083 | 11/1930 | Schmick | 74—425 |
| 2,578,784 | 12/1951 | Dath | 74—425 |
| 2,635,485 | 4/1953 | Gravenstine et al. | 74—425 X |
| 2,881,629 | 4/1959 | Homier | 74—425 |
| 2,924,151 | 2/1960 | Ufert | 74—425 X |
| 2,949,042 | 8/1960 | Bennett | 74—425 |
| 3,048,051 | 8/1962 | Pickles | 74—425 |

DONLEY J. STOCKING, *Primary Examiner.*

DAVID J. WILLIAMOWSKY, *Examiner.*

L. H. GERIN, *Assistant Examiner.*